United States Patent [19]

Fink

[11] Patent Number: 5,096,645
[45] Date of Patent: Mar. 17, 1992

[54] METHOD OF FORMING REINFORCED THERMOPLASTIC MEMBERS

[75] Inventor: Roy G. Fink, Jackson, Mich.

[73] Assignee: Plastigage Corporation, Jackson, Mich.

[21] Appl. No.: 597,490

[22] Filed: Oct. 9, 1990

[51] Int. Cl.⁵ .............. B29C 35/02; B29C 47/02; B29C 47/28; B29C 67/00
[52] U.S. Cl. .............................. 264/137; 65/3.43; 156/161; 156/244.12; 156/244.19; 156/269; 264/149; 264/174; 264/211.12; 264/229; 264/231; 427/175; 427/385.5; 427/389.7; 427/407.1; 427/407.2; 427/434.6
[58] Field of Search ............... 264/136, 137, 149, 151, 264/171, 174, 176.1, 211.12, 229, 231, 236, 237, 257, 347, 348; 156/160, 161, 178, 180, 244.12, 244.19, 269; 427/172, 175, 385.5, 389.7, 407.1, 407.2, 434.6; 65/3.43, 3.44

[56] References Cited

U.S. PATENT DOCUMENTS

| | | | |
|---|---|---|---|
| 1,400,078 | 12/1921 | Kempton | 138/141 |
| 3,352,060 | 11/1967 | Thams | 49/192 |
| 3,384,522 | 5/1968 | Rubenstein | 156/242 |
| 3,470,598 | 10/1969 | Berthelsen | |
| 3,530,212 | 9/1970 | Kienle et al. | 264/137 |
| 3,574,104 | 4/1971 | Medler | 428/222 |
| 3,657,040 | 4/1972 | Shobert | 156/178 |
| 3,993,726 | 11/1976 | Moyer | 264/174 |
| 4,257,833 | 3/1981 | Jensen | 156/160 X |
| 4,394,338 | 7/1983 | Fuwa | 264/174 X |
| 4,471,215 | 9/1984 | Blumer | 264/174 X |
| 4,740,405 | 4/1988 | Tanaka et al. | 428/45 |

FOREIGN PATENT DOCUMENTS 51-7076  1/1976  Japan .................................. 264/229

*Primary Examiner*—Leo B. Tentoni
*Attorney, Agent, or Firm*—Beaman & Beaman

[57] ABSTRACT

Extruded thermoplastic members, particularly structural members, are reinforced by longitudinally extending pre-stressed elements, such as filaments or matting. The elements, while under tension, are drawn into an extrusion crosshead die forming the thermoplasatic member. The elements are fully imbedded within the thermoplastic material while under tension and curing of the thermoplastic material, and final curing of the tensioned reinforcing elements, if a thermosetting resin impregnated element is used, occurs while the elements are under tension, the material of the member and the elements intimately bond and the tension forces within the elements reinforce the member at the desired locations. The forming of the reinforced member is a continuous operation.

2 Claims, 4 Drawing Sheets

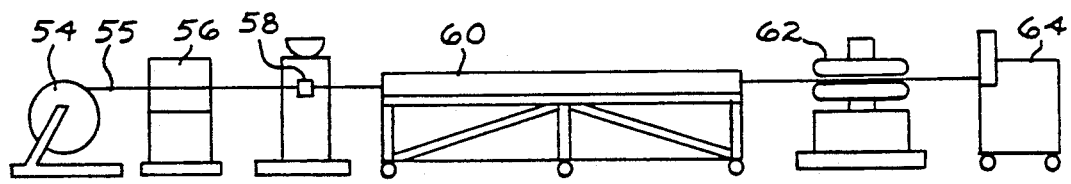
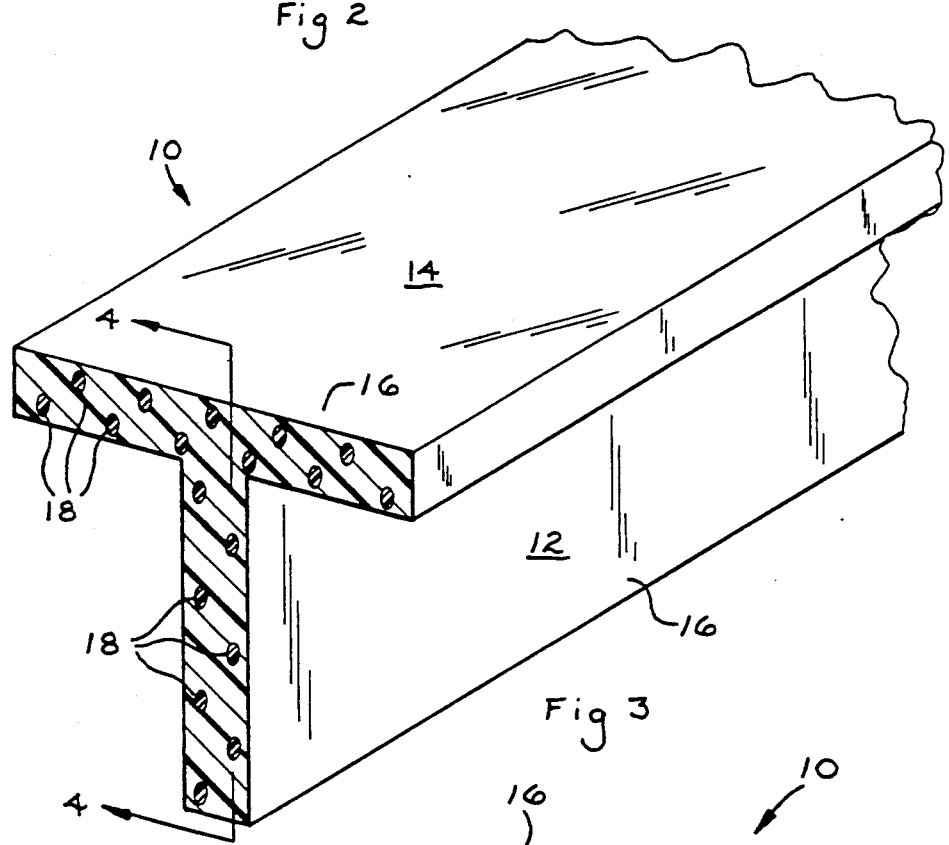
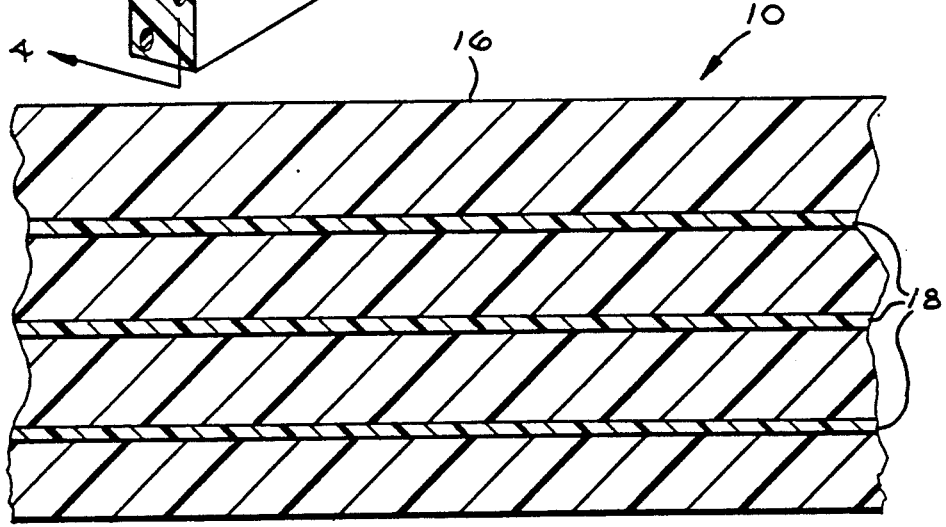

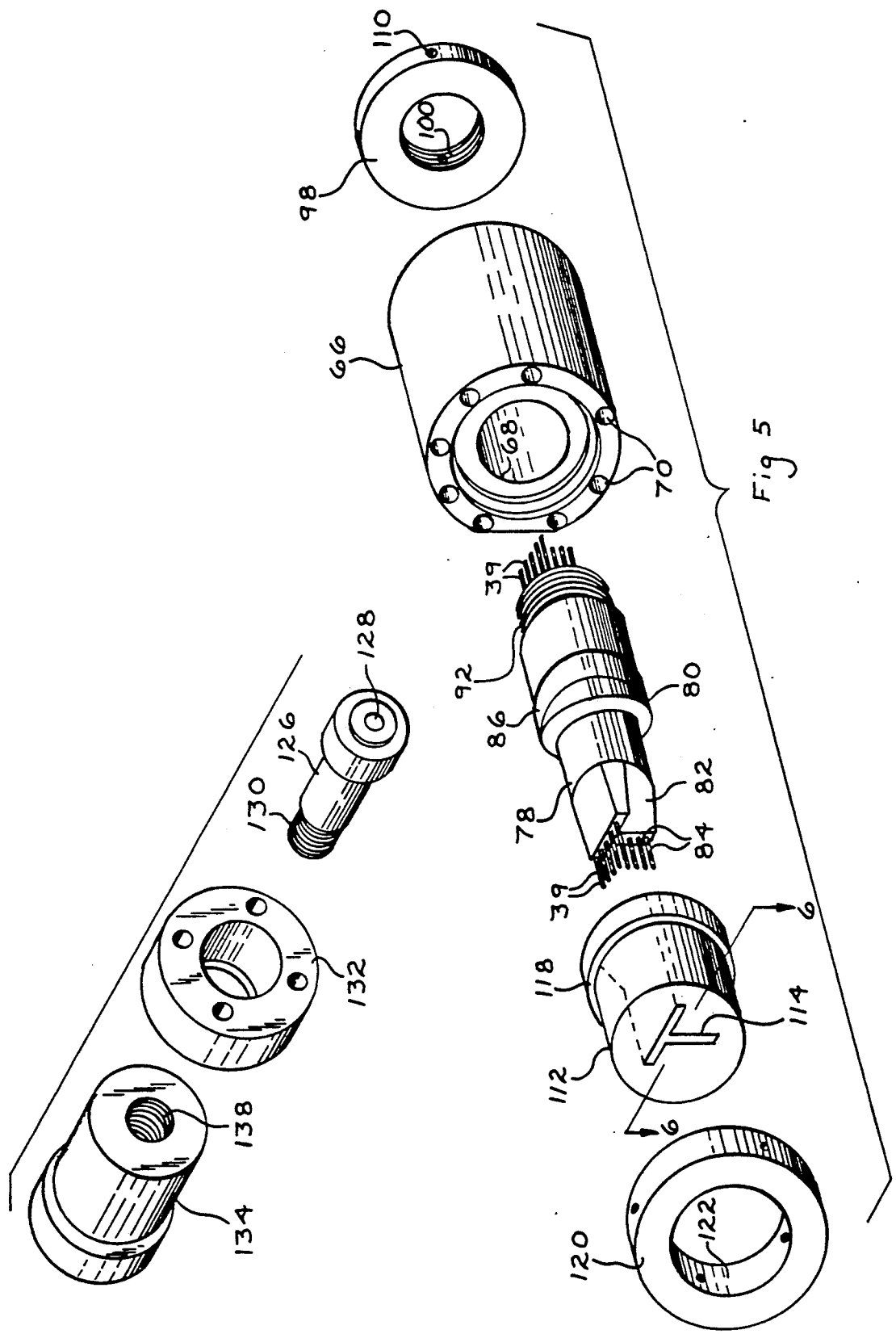

METHOD OF FORMING REINFORCED THERMOPLASTIC MEMBERS

BACKGROUND OF THE INVENTION

The pre-stressing of reinforcing elements within concrete beams is utilized to impart high bending resistance to a relatively low mass, lightweight beam. Such a structure is typified in the disclosure of U.S. Pat. No. 3,384,522.

Also, it is known to reinforce extruded or molded plastic members with imbedded elements wherein the elements provide the member with a higher strength, and the plastic material provides resistance to corrosion, an attractive appearance, and protects the element. Disclosures of this type are shown in U.S. Pat. Nos. 3,352,060 and 3,470,598.

Glass fiber reinforced members utilizing thermosetting resins may be formed by a process commonly called "pultrusion" wherein the element is formed by a plurality of glass fiber filaments wetted with a thermosetting resin, pulled through a die for shaping, and the resin impregnated filaments are cured and the member cut to length. As the filaments are pulled through the processing apparatus the filaments are maintained under tension during curing and members so constructed have a high resistance to tensile forces. U.S. Pat. No. 3,657,040 discloses apparatus of this type.

It is also known to utilize glass fiber elements in conjunction with shaped plastic structural members wherein the elements are imbedded within the plastic member to improve the bending resistance of the member, and in the assignee's U.S. Pat. No. 3,574,104 a disclosure of a construction member of this type is made.

The imbedding of reinforcing elements within thermoplastic members formed by extrusion is also known as shown in U.S. Pat. No. 4,740,405, and in the production of such a member a crosshead die may be used to imbed the elements within the thermoplastic material. However, while such known constructions as exemplified by the aforementioned patent produce a member which is reinforced by the elements, the elements are not pre-stressed and the resistance to tension forces applied to the member is limited.

Previously, the formation of a thermoplastic extruded member utilizing imbedded pre-stressed tensioned elements has not been accomplished, and it is an object of the invention to provide such an extruded thermoplastic member having greater resistance to bending than similar members not utilizing pre-stressed elements.

Another object of the invention is to provide a structural member formed of extruded thermoplastic material wherein the material is extruded about tensioned reinforcing elements and the initial tension on the elements is not relieved until the member material has cured wherein integral bonding between the material of the member and elements is achieved and the elements impose compressive forces upon the thermoplastic material.

An additional object of the invention is to provide a process for forming a reinforced thermoplastic structural member utilizing pre-stressed reinforcing elements wherein the pre-stressing of the elements, the extrusion of the thermoplastic configuration, and the curing of the structural member is formed in a continuous process.

A further object of the invention is to provide a thermoplastic extruded structural member reinforced by glass fibers imbedded in a thermosetting resin to form reinforcing elements wherein the impregnation of the glass fibers with the resin and the formation of the elements is continuous with the formation of the extruded structural member whereby heating and curing of the elements and member is continuous to efficiently utilize heat, and improve bonding between the elements and the member material.

In the practice of the invention the raw reinforcing material, which usually takes the form of glass fiber filaments, or a woven or non-woven web formed of glass fiber filaments is preheated and then passed through a thermosetting resin. The resin is wiped from the glass fiber material and shaped to form a particular reinforcing element configuration and the reinforcing element passes through a heated curing chamber wherein the element is partially cured and substantially hardened. The element then passes into the crosshead die of extrusion apparatus which includes a die configuration to define the outer structural member form and internal guides within the crosshead maintain the reinforcing elements in a predetermined relationship to each other and the form of the structural member being extruded through the crosshead die as formed of a thermoplastic material.

The structural member leaving the extrusion press crosshead will be of a configuration as determined by the crosshead die opening and contain the reinforcing material therein. This assembly is immediately exposed to a quenching process, either water or air, to lower the temperature of the thermoplastic structural member. The formed and hardened structural member then passes through the traction device which has been tensioning the structural member bar and the reinforcing elements throughout the entire process, and thereafter, the structural member bar being formed is cut into desired lengths and thereafter punched or otherwise processed.

The fact that the reinforcing elements are tensioned as they pass through the extrusion press, and while the thermoplastic structural member body is curing and hardened, causes the reinforcing elements to be tensioned or pre-stressed as imbedded within the final structural member. The location of the elements relative to each other and the form of the structural member is predetermined with respect to the lateral bending forces to be imposed upon the structural member so as to give the resultant structural member the greatest resistance to bending in the appropriate direction.

The reinforcing elements are, preferably, fully imbedded within the thermoplastic material so as to be hidden from view, and as the thermoplastic material can be colored or otherwise treated in an attractive manner, the practice of the invention permits aesthetically acceptable structural members of a lightweight, complex configuration to be formed which are also capable of resisting significant deflection under lateral bending forces.

The exterior surface of the reinforcing elements may be roughened, or otherwise treated, so as to improve the bonding or adhesion between the tension elements and the thermoplastic material, and structural members constructed in accord with the invention are capable of significantly greater resistance to bending as compared with non-reinforced members, or thermoplastic members having reinforcing elements located therein which are not pre-stressed or installed under tension.

BRIEF DESCRIPTION OF THE DRAWINGS

The aforementioned objects and advantages of the invention will be appreciated from the following description and accompanying drawings wherein:

FIG. 2 is an elevational schematic view of apparatus for practicing the inventive concept using a glass fiber mat to form the reinforcing element, FIG. 3 is an enlarged transverse cross-sectional view of a T-shaped structural member utilizing the concept of the invention, FIG. 4 is an elevational sectional view as taken along Section 4—4 of FIG. 3, FIG. 5 is an exploded perspective view of the crosshead apparatus.

DESCRIPTION OF THE PREFERRED EMBODIMENT

FIGS. 3 and 4 illustrate a thermoplastic structural member utilizing the concepts of the invention, the structural member being illustrated in a transverse cross-section. The structural member shown in FIGS. 3 and 4 is of a T configuration, however, it is to be appreciated that the member may be of any desired configuration capable of being formed by extrusion.

In FIGS. 3 and 4 the structural member 10 includes a column 12 having a transverse upper flange 14. Outer surfaces 16 are defined upon the column and flange. A plurality of reinforcing elements 18 are located within the column and flange and the reinforcing elements extend in a longitudinal direction parallel to the longitudinal length of the member 10 and are spaced relative to each other as desired to most effectively provide the strength characteristics desired for the member 10.

The elements 18, as shown in FIG. 3, are substantially evenly spaced relative to each other to provide a uniform reinforcement throughout the member cross-section. If the member 10 is to be subjected to high bending forces in a downward direction as viewed in FIG. 3 a greater number of elements 18 would be located toward the lower region of the column 12 in view of the tension forces that would be applied to the member since the elements 18 resist tension forces in the member. Conversely, if the primary lateral forces to be imposed upon member 10 are in an upward direction as viewed in FIG. 3 a greater number of reinforcing elements 18 would normally be located within the flange 14.

The reinforcing elements 18 may be located as desired within the cross-sectional configuration of the member 10. Normally, the elements 18 will be inset sufficiently from the member surfaces 16 such that the elements will not be exteriorly visible, and a member 10 constructed in accord with the invention, although reinforced, will have a conventional exterior appearance and may be of a desired color or surface treatment.

Figure 1:
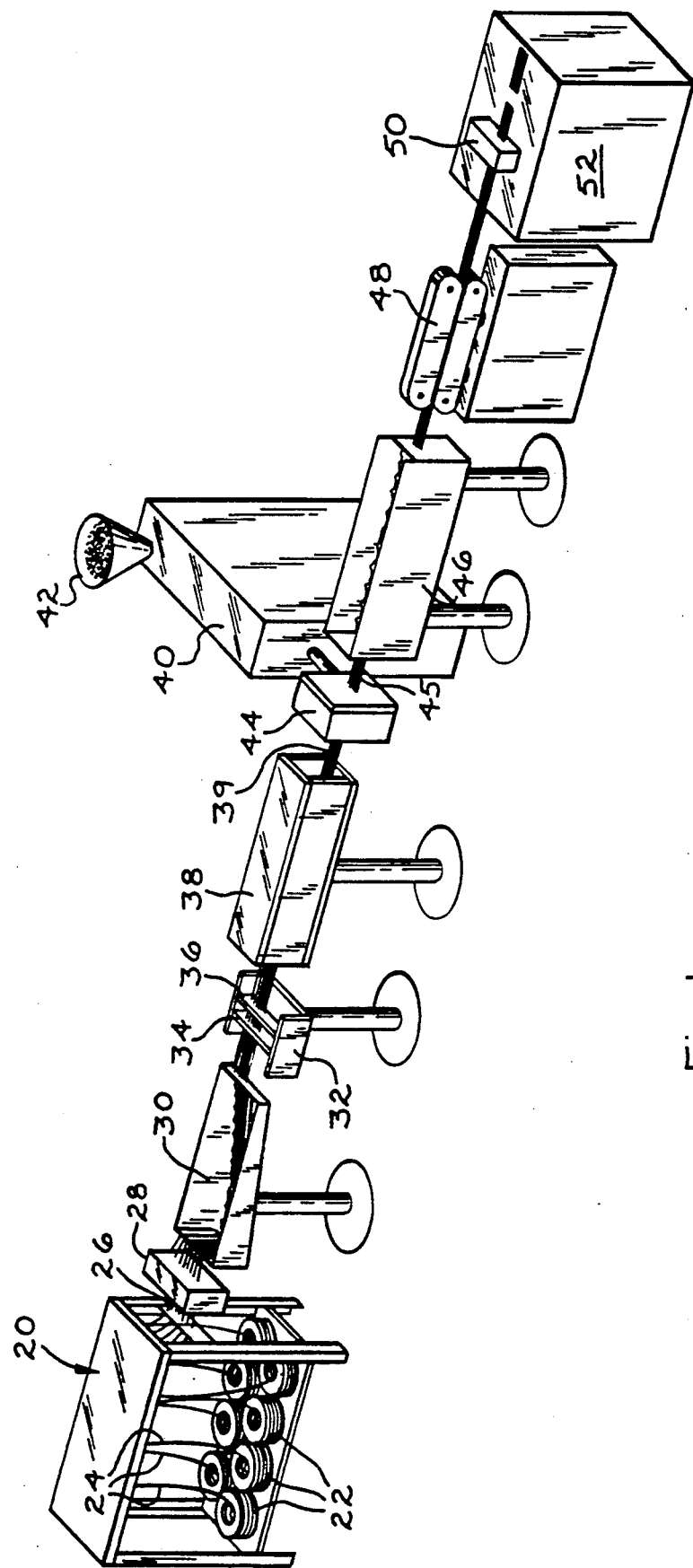
FIG. 1 is a perspective view schematically illustrating the process and equipment therefore for practicing the inventive concepts using elongated glass fiber filaments to form the reinforcing element.

A typical production line wherein the process of the invention may be practiced is shown in FIG. 1. A significant aspect of the invention lies in the ability of composite structural members in accord with the inventive concepts which utilize several components to have the components simultaneously fabricated and bonded to result in an integral structural member capable of providing high resistance to lateral bending. The ability to produce structural members in accord with the invention with a single "pass" of the components through a process line reduces cost, improves quality, and effectively utilizes the energy used to cure and process the material of the structural member.

With reference to FIG. 1, the reinforcement playoff unit 20 consists of a support for the glass fiber filament rolls 22 from which the glass fiber filaments 24 may be dispensed. The glass fiber filaments 24 are of the well known monofilament type as used in forming glass fiber components such as insulator rod or such wherein the filaments are imbedded within a thermosetting resin. As later described, a wide variety of filament materials may be used for reinforcement, and in this explanation glass fiber filament is only used by way of illustration.

The reinforcement playoff structure 20 supports guide orifices 26 through which the filaments 24 are individually received such that the guide orifices 26 will maintain the filaments in an orderly pattern as they pass through the preheater 28. The preheater 28 may be electrical or steam, and preheats the glass filaments to approximately 250° Fahrenheit prior to wetting the filaments in the resin bath 30.

The resin bath 30 constitutes an elongated tank through which the filaments 24 pass, and after being wetting by the thermosetting resin within the resin bath the filaments pass into the resin wipe 32 which includes an initial die 34 and a finish die 36 from which excess resin has been removed. The die 36 consists of a plurality of usually cylindrical dies which shape the reinforcing elements as indicated at 39 each of which now consist of a plurality of filaments 24 and the elements may be of a cylindrical configuration, or other form, as desired.

The impregnated and initially shaped element strands now enter the heated curing chamber 38 which heats the impregnated glass fibers to approximately 550° Fahrenheit wherein the reinforcing elements begin to solidify and are partially cured. The reinforcing elements exiting the curing chamber 38 enter the extrusion apparatus. The extrusion apparatus includes a conventional extrusion machine 40, such as a Davis Standard extruder which includes a storage hopper 42 into which the solid thermoplastic material granules are placed. The extrusion apparatus also includes a crosshead 44 which receives the elements 39, as later described, and the extruded bar 45 leaving the extrusion crosshead 44 is of the desired cross-sectional configuration for the resultant structural member. The rate of movement of the extruded material from crosshead 44 is the same as the rate of movement of the reinforcing elements 39 through the crosshead. The extruded bar 45, containing the reinforcing elements 39, passes into the quench tank 46 which may contain water at 60° Fahrenheit and the bar 45 will be immediately cooled and finish solidified. While the illustrated quench tank 46 constitutes a water bath, air cooled quenching may also be used.

The bar 45 containing the filaments 24 is pulled through the apparatus by the belt-type puller 48 into which the bar 45 passes, and it is the puller 48 which maintains the desired tension in the elements 39 during the process. As the filaments 24 are pulled through the dies 34 and 36 sufficient resistance to movement is achieved to produce a pre-stressed or pre-tensioned condition in the filaments of the elements 39 as the reinforcing elements 39 pass into the extruder crosshead 44. Thus, while the final curing and cooling of the bar 45 takes place within quench tank 46 the elements 39 remain under tension while bonding takes place with the thermoplastic material which has been extruded around the elements 39.

The composite member or bar 45 is of a solid form as it passes through the puller 48, and will pass into the guide 50 located on the cutoff machine 52 wherein the bar 45 may be cut to the desired length to form the structural member 10 as previously described. It will be appreciated that upon cutting of the bar 45 to form a structural member 10 that the reinforcing elements 39 become the elements 18 of the member 10.

From the above description it would be appreciated that the puller 48 constitutes the means for moving the formed bar 45 through the fabricating line, and as the reinforcing elements 39, as they leave the curing chamber 38, still contain considerable residual heat, the introduction of the heated elements into the extrusion crosshead 44 aids in bonding of the reinforcing elements to the thermoplastic material being extruded about the elements in the crosshead 44, and in similar manner the heat from the thermoplastic extrusion process cures the thermoset resin while the elements 39 are under tension and a most effective utilization of energy is achieved.

Structural members in accord with the invention may employ webbing, as well as longitudinal elements, as reinforcement, and a typical processing line for using a webbing reinforcement is shown in FIG. 2, in abbreviated and schematic form.

With reference to FIG. 2, a drum 54 is shown upon which a woven or unwoven web of glass fiber reinforcement 55 is dispensed. The web 55 passes through a preheater, resin bath, wiper and curing chamber schematically illustrated at 56, and therefrom passes into the extruder unit crosshead 58. Thermoplastic material is extruded about the impregnated and formed reinforcing element and the extruded bar passes through the quench tank 60 for solidification. The belt-type puller 62 comprises the means for pulling the formed bar through the process line and also maintains the desired tension within the web 55 as to prestress the tension forces imposed on the web 55 while the thermoplastic material in the extruder crosshead 58 is extruded about the web. The cutoff apparatus 64 receives the bar from the puller 62 wherein structural members of desired length are formed.

The inventive concepts of the process shown in FIG. 2 are identical to those of FIG. 1, the only difference being that the reinforcing element constitutes a thermosetting resin impregnated web, rather than a plurality of elongated elements of relatively limited diameter.

Figure 6:
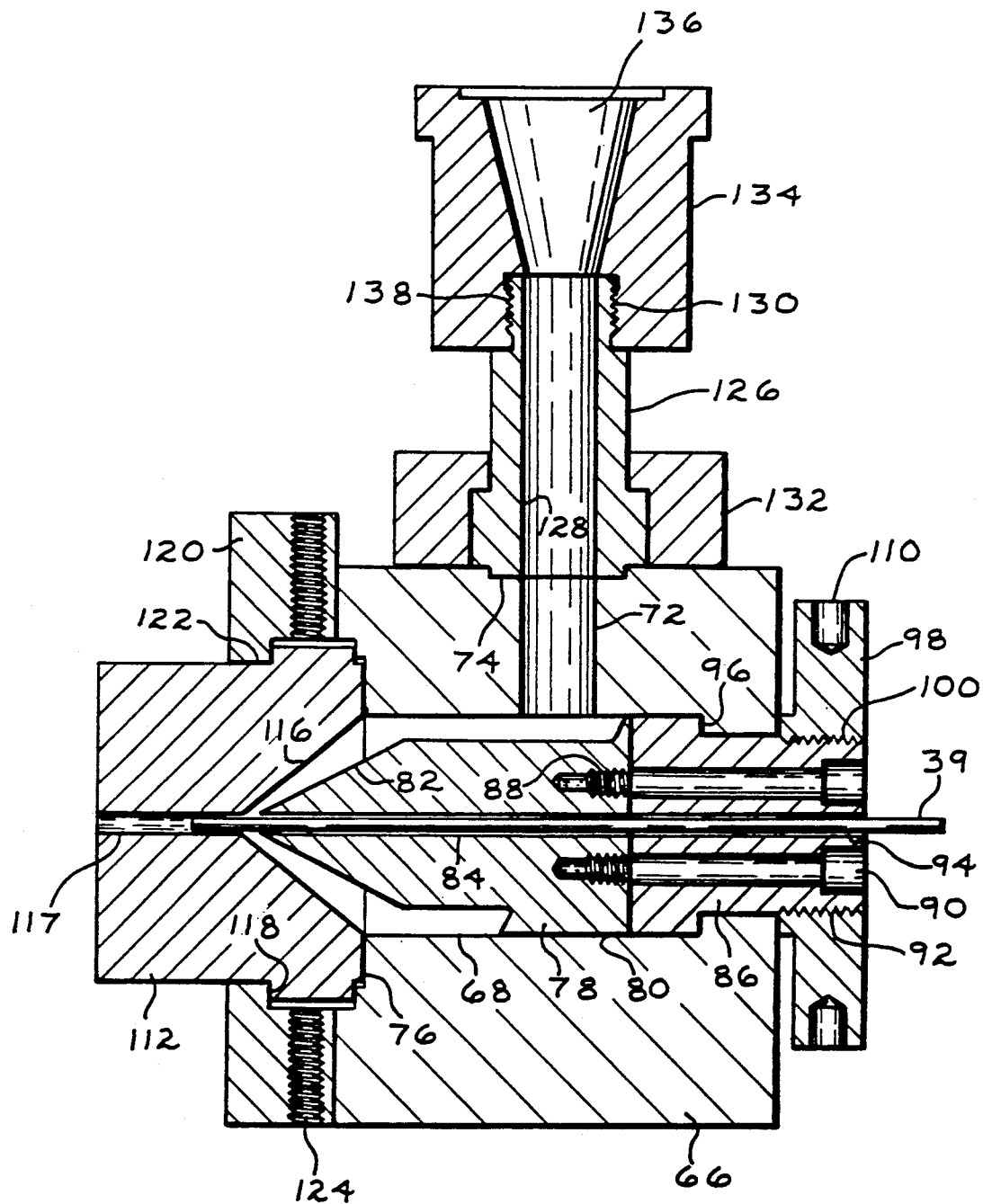
FIG. 6 is an elevational sectional assembly view of the extrusion press crosshead as taken along Section 6—6 of FIG. 5.

The crosshead 44, in detail, is best appreciated from FIGS. 5 and 6. The crosshead includes a cylindrical body 66 having a bore 68 defined therein and a plurality of cooling passages 70 may be defined in the body 66 through which water is passed to maintain the body at the desired operating temperature. The body 66 includes a transverse passage 72, FIG. 6, which intersects the bore 68, and a countersink 74 is concentrically related to the bore 72 while the countersink 76 is concentrically related to the bore 68.

The positioning and guidance of the reinforcing elements 39 within the crosshead 44 is achieved by the pin 78 located within the crosshead body bore 68. The pin 78 includes an outer diameter 80 wherein the pin will be properly located within the body 66. The pin includes a nose 82 of converging surfaces, as will be best appreciated from FIG. 5, and the nose 82 terminates in an end having a configuration similar to that of the structural member to be extruded, and a plurality of reinforcing element guide bores 84 longitudinally extend through the pin 78 and intersect the nose end 82. The guide bores 84 ar positioned within the pin in the pattern desired for the location of the reinforcing elements 18 of the finished structural member.

The pin 78 includes a base 86 affixed to the right end of the pin as shown in FIGS. 5 and 6, and the right end of the pin includes threaded holes 88 for receiving bolts 90 whereby the base 86 may be attached to the pin. A thread 92 is defined on the outer end of the base, and the base includes bores 94 for receiving the reinforcing elements, the bores 94 aligning with the pin bores 84. A shoulder 96 engages a complimentary shoulder within the body bore 68 wherein the pin and base are axially positioned within the bore 68.

The pin and base are held within the body 66 by the collar 98 having a threaded bore 100 which threads upon the base threads 92. The collar bears against the end of the body 66 and may be tightened by applying a spanner wrench, not shown, to the collar spanner holes 110.

The crosshead 44 includes a die 112 mounted within the body countersink 76, and the die 112 includes a die orifice 114 of the desired T-configuration of the finished structural member. The die includes a converging passage 116 located adjacent to, but spaced from the pin nose 82, and the die includes a throat 117 between the passage 116 and the orifice 114. Shoulder 118 formed on the die cooperates with collar 120 having bore 122, and screws 124 located within the collar may be tightened against the die 112.

The thermoplastic material from the hopper 42 is fed into the crosshead body 66 through the nozzle 126 having a bore 128, FIG. 6. The nozzle 126 is threaded at one end at 130, and a collar 132 maintains the nozzle on the crosshead body 66 such that the nozzle bore 128 communicates with the body passage 72.

A gate adapter 134 having a bore 136 of a conical configuration also includes threads 138 whereby the gate adapter may be threaded upon the nozzle 126. The gate adapter bore 136 communicates with the liquified thermoplastic material formed by the extruder 44 wherein the pressurized material passe through the nozzle 126 into the crosshead body bore 68.

Due to the spacing between the pin surface 82 and the die passage 116 the thermoplastic material within the bore 86 will surround the reinforcing elements 39 within the die throat 117 as located therein by the pin guide bores 84. In this manner the reinforcing elements 39 are completely imbedded within the thermoplastic material flowing through the die 112 and the configuration of the bar leaving the die 112 will be determined by the shape of the orifice 114. Accordingly, it will be appreciated that the bar exiting the die 112 will be of the cross-sectional configuration as shown in FIG. 3 having the reinforcing elements 39, which constitute the reinforcing elements 18 after the structural member is cut to the desired length.

The use of the pin 78 permits the reinforcing elements 39 to be located as desired within the finished structural member configuration since a different pin 78 will be used for each structural member, and as discussed above, the reinforcing elements may be located as desired to most effectively reinforce the finished member 10.

Of course, in the concept of the invention it is important that a strong bonding take place between the reinforcing elements 39 and the thermoplastic material passing through the die head 112. Chemical compatibility between the thermosetting resin of the reinforcing elements 39 with the thermoplastic material entering the nozzle 126 aids in this respect. Further, superior bonding is achieved by roughing or serrating the outer surface of the reinforcing elements 39 such as by the configuration of the orifices in the finish die 36.

It is to be appreciated that the geometry of the reinforcing elements 39 may take a wide variety of forms as required by the particular application and type of reinforcement of the structural member desired. The heat present at the thermoplastic extrusion constitutes the final curing of the thermosetting resin of the reinforcing elements while under tension, and as it is possible to very closely control the time, temperature and pressure occurring in the die 112 it is possible to produce the critical relationships with respect to bonding with the reinforcement as desired.

In the above description the reinforcement has been described as glass fiber. However, it is to be appreciated that the reinforcing filaments 24, or the reinforcement web 55 can be formed of other materials. It is within the purview of the invention to form the reinforcing elements of material such as cotton, graphite, carbon, boron, ceramic, jute, steel, or the like. The significant aspect of the reinforcing element be that the element be capable of withstanding tensile forces and be sufficiently flexible to be positioned as desired by the guide bores within pin 78, and sufficient bonding must take place with the thermoplastic material at the extrusion press crosshead so as to maintain the reinforcing element under tension after curing of the thermoplastic material occurs.

A variety of thermoplastic materials may be extruded through the extruder 40 for forming the structural member. For instance, polycarbonates, polyvinyl chlorides, polyethylene, polystyrene, ABS, TPO, acrylic, fluorocarbon, polysulfone, alethal, nylon, polypropylene, and vinyls may be used. When reinforcing the member 10 with a web or roving 55, a continuous multiple end roving or a continuous single end roving may be used, as well as woven roving, mat, cloth, veil, or yarn.

The process of the invention reduces linear expansion and contraction of the thermoplastic member and the member can be post formed into a limited arcuate configuration, if desired. Also, the member can be reground and reprocessed into a molded product if recycling of the member after initial use is desired.

From the above description, it will be appreciated that the inventive concepts may be practiced with a relatively wide range of materials as used for reinforcement or forming the thermoplastic body of the structural member. The particular material employed will be determined by the particular application desired, and it is intended that the invention only be defined by the scope of the following claims.

I claim:

1. The method of continuously forming by extrusion rigid, solid, elongated, pre-stressed, structural reinforced thermoplastic members of a desired length having thermosetting resin impregnated reinforcing elements comprising the steps of:
   a) sequentially pulling a plurality of flexible elongated tensioned filaments through a thermosetting resin bath, wiping die, a partial curing chamber and extrusion press crosshead while maintaining the filaments under tension to form elongated pre-stressed reinforcing elements, the elements having a predetermined rate of movement,
   b) extruding a hot thermoplastic synthetic material through the extrusion press die orifice at a rate of movement substantially equal to said elements' rate of movement whereby said material encompasses said elements,
   c) locating the partially cured tensioned elements within the extrusion press die orifice in a predetermined manner to pre-stress and reinforce the structural member transverse cross section determined by the die orifice in a predetermined manner,
   d) solidfying said thermoplastic material about said elements while said elements are under tension to final cure the resin impregnated elements and to bond said material to said tensioned elements to form a rigid, solid pre-stressed reinforced extruded structural member under internal compression adjacent said elements, and
   e) cutting said bonded solidified extruded member to the desired length.

2. The method of continuously forming by extrusion structural reinforced thermoplastic members as in claim 1, wherein said filaments comprise glass fiber filaments.

* * * * *